(12) United States Patent
Hirayama

(10) Patent No.: US 8,607,511 B2
(45) Date of Patent: Dec. 17, 2013

(54) SOLAR CELL MODULE

(75) Inventor: Kitae Hirayama, Ise (JP)

(73) Assignee: Kyocera Corporation, Kyoto (JP)

( * ) Notice: Subject to any disclaimer, the term of this patent is extended or adjusted under 35 U.S.C. 154(b) by 366 days.

(21) Appl. No.: 12/934,998

(22) PCT Filed: Mar. 26, 2009

(86) PCT No.: PCT/JP2009/056198
§ 371 (c)(1),
(2), (4) Date: Sep. 27, 2010

(87) PCT Pub. No.: WO2009/119775
PCT Pub. Date: Oct. 1, 2009

(65) Prior Publication Data
US 2011/0011446 A1    Jan. 20, 2011

(30) Foreign Application Priority Data

Mar. 26, 2008 (JP) .................... 2008-081167

(51) Int. Cl.
*H01L 31/042* (2006.01)

(52) U.S. Cl.
CPC .................. *H01L 31/0422* (2013.01)
USPC ............. 52/173.3; 52/209; 52/656.1

(58) Field of Classification Search
USPC ........ 52/173.3, 209, 656.1; 126/244; 136/244
See application file for complete search history.

(56) References Cited

U.S. PATENT DOCUMENTS

| | | | | |
|---|---|---|---|---|
| 2,706,543 A | * | 4/1955 | Kammerer | 52/656.2 |
| 2,914,145 A | * | 11/1959 | Benson | 52/209 |
| 3,636,660 A | * | 1/1972 | Peterson | 52/209 |
| 3,845,599 A | * | 11/1974 | Jolly | 52/209 |
| 4,553,361 A | * | 11/1985 | Ralph | 52/209 |
| 7,987,644 B2 | * | 8/2011 | Walker et al. | 52/656.5 |
| 8,458,968 B2 | * | 6/2013 | Shoshan | 52/209 |

FOREIGN PATENT DOCUMENTS

| | | |
|---|---|---|
| EP | 2267792 A1 | 12/2010 |
| JP | 59-138251 | 9/1984 |
| JP | 61-127650 | 8/1986 |
| JP | 11-325610 | 11/1999 |
| JP | 2003-282919 | 10/2003 |
| WO | 2009119775 A1 | 10/2009 |

OTHER PUBLICATIONS

Japanese language office action dated Jul. 2, 2013 and its English language Statement of Relevance pursuant to 37 CFR 1.98(a)(3)(i) issued in corresponding Japanese application 2011201609 cites the foreign patent document listed above.

* cited by examiner

*Primary Examiner* — Mark Wendell
*Assistant Examiner* — Matthew J Smith
(74) *Attorney, Agent, or Firm* — DLA Piper LLP (US)

(57) ABSTRACT

A technology of enhancing drainability of a hollow member of a frame without reducing strength of the frame is provided. A solar cell module according to one embodiment of the present invention includes: a first frame that includes a first hollow member having a first space therein and has a first drain port through which the first space and an outer space are communicated with each other; and a second frame that is connected to the first frame and includes a second hollow member having a second space therein. An opening that is open so as to overlap part of the first drain port is formed at an end part of the second hollow member.

7 Claims, 7 Drawing Sheets

F I G . 6
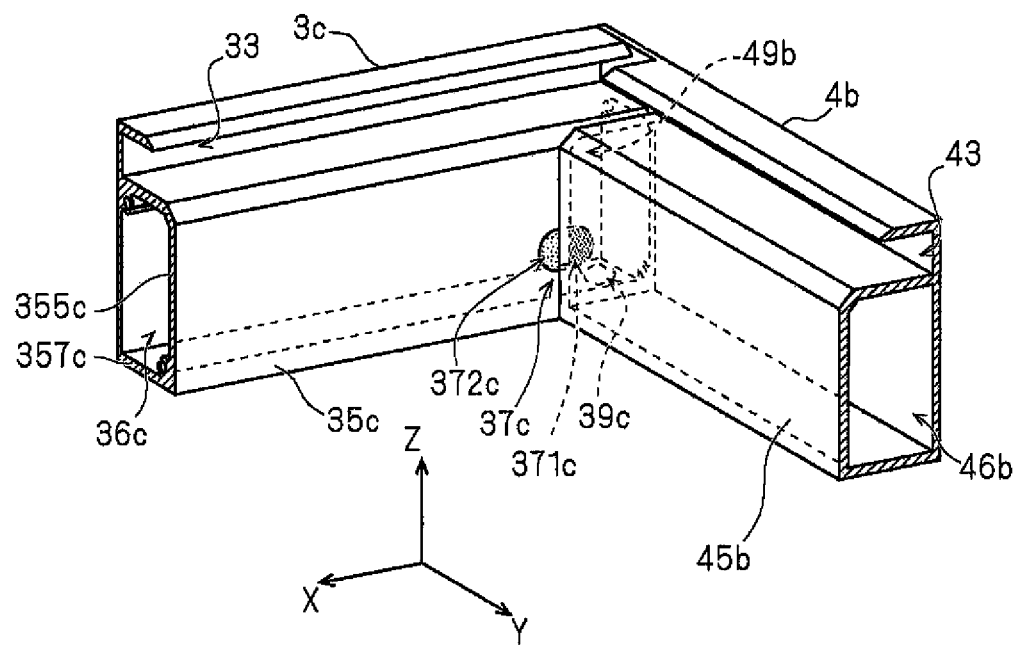

SOLAR CELL MODULE

CROSS-REFERENCE To The RELATED APPLICATIONS

This application is a national stage of international application No. PCT/JP2009/056198, filed on Mar. 26, 2009, and claims the benefit of priority under 35 USC 119 to Japanese Patent Application No. 2008-081167, filed on Mar. 26, 2008, the entire contents of which are incorporated herein by reference.

1. Technical Field

The present invention relates to a solar cell module, and more particularly, to a solar cell module including frames.

2. Background Art

In recent years, solar cell modules that produce electric power by photoelectric conversion of sunlight have been widely used. The solar cell modules are required to withstand various environmental burdens (for example, snow load and wind pressure), and hence frames are installed on a periphery of a solar cell panel including a solar cell element.

In order to increase the strength of a frame without increasing a weight thereof, a hollow member whose inside is hollow is provided in the frame in some cases, but in this case, water such as rainwater is likely to enter the hollow member to be accumulated. Accordingly, when freezing or the like occurs in the hollow member, the hollow member is deformed, leading to a fear that a solar cell module 1 may be damaged. Therefore, Japanese Patent Application Laid-Open No. 2003-282919 discloses the technology of providing drain holes in a hollow member.

However, while the drainability is enhanced as the number of drain holes increases, the strength of a frame may decrease due to an increased number of holes. Therefore, the technology of enhancing the drainability of a frame without reducing the strength is required.

DISCLOSURE OF INVENTION

An object of the present invention is to provide a technology of efficiently discharging the water that has entered a hollow member while decreasing a reduction in strength of a frame.

A solar cell module according to a first embodiment of the present invention includes: a solar cell panel; an elongated first frame installed along a first edge of the solar cell panel; and a second frame installed along a second edge of the solar cell panel. The first frame includes an elongated first hollow member that supports a back surface of the solar cell panel. The first hollow member has a first space therein and a first communication hole communicated with the first space. The second frame includes an elongated second hollow member that supports the back surface of the solar cell panel. The second follow member has a second space. The first communication hole of the first hollow member has a first opening region communicated with the second space of the second hollow member and a second opening region communicated with an outer space.

With the configuration described above, the solar cell module can discharge the water that has entered the first hollow member of the first frame and the second hollow member of the second frame through the first communication hole of the first frame. Therefore, the reduced number of drain holes enables effective drainage while decreasing a reduction in frame strength.

BRIEF DESCRIPTION OF DRAWINGS

FIG. 1A is a plan view showing a state of the solar cell module viewed from a light receiving surface side, and FIG. 1B is a cross-sectional view taken along a line A-A' shown in FIG. 1A.

FIG. 2A is a perspective view showing a disassembled state, and FIG. 2B is a perspective view showing a connected state.

FIG. 5A is a perspective view showing a disassembled state, and FIG. 5B is a perspective view showing a connected state.

FIG. 6 is a perspective view showing a connected portion of a first frame and a second frame according to a fourth embodiment.

FIG. 7A is a perspective view showing a disassembled state, and FIG. 7B is a perspective view showing a connected state.

BEST MODES FOR CARRYING OUT THE INVENTION

A plurality of embodiments of the present invention are described in detail with reference to the drawings.

(First Embodiment)

(Solar Cell Module)

Figure 1A:
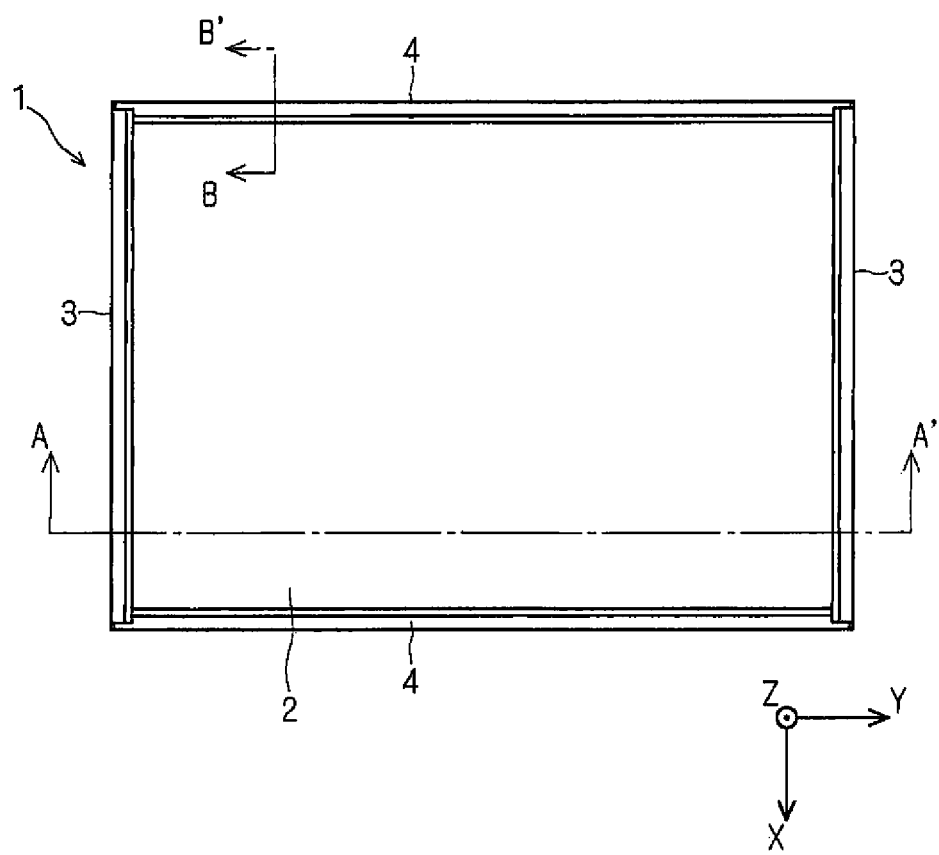
FIGS. 1A and 1B are views showing a solar cell module according to a first embodiment of the present invention.

A solar cell module 1 shown in FIG. 1A includes a solar cell panel 2 and first frames 3 and second frames 4 that protect the solar cell panel 2. The first frames 3 are provided along a pair of first sides (first edges) of the solar cell panel 2, and the second frames 4 are provided along a pair of second sides (second edges) of the solar cell panel 2. The first frame 3 and the second frame 4 are connected to each other at end parts in longitudinal directions thereof, and the solar cell panel 2 is protected by a frame composed of the first frames 3 and the second frames 4 that are alternately connected. The solar cell module 1 as described above is used by being mounted on a platform for installation (not shown) or the like.

Note that in FIGS. 1A and 1B to FIGS. 7A and 7B, the longitudinal direction of the first frame 3 is defined as an x-axis direction, the longitudinal direction of the second frame 4 in the solar cell module 1 is defined as a Y-axis direction, and the direction perpendicular to an XY plane defined by those is defined as a Z-axis direction.

(Solar Cell Panel)

Figure 1B:
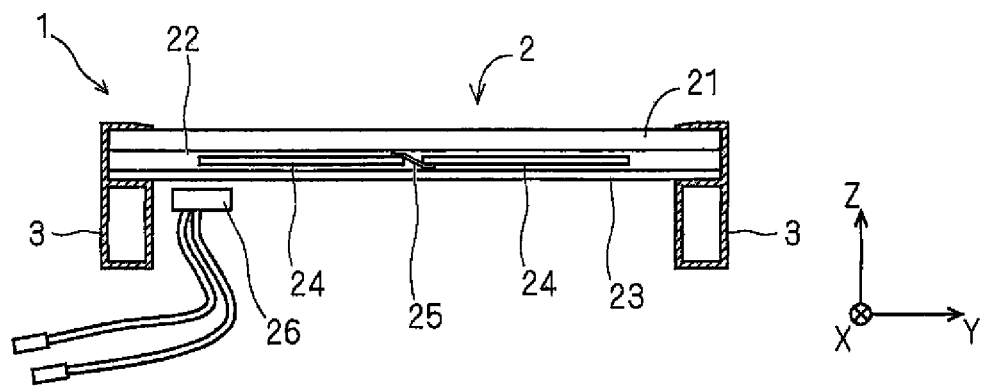

As shown in FIG. 1A, the solar cell panel 2 is substantially rectangular in plan view. As shown in FIG. 1B, the solar cell panel 2 includes a translucent substrate 21, a back surface protective member 23, a plurality of solar cell elements 24 disposed between the translucent substrate 21 and the back surface protective member 23, an inner lead 25 that electrically connects the solar cell elements 24, and a filler 22 that covers the solar cell elements 24, and has a superstrate structure in which those are laminated. A terminal box 26 is mounted onto the back surface protective member 23. The electric power obtained through photoelectric conversion by the solar cell elements 24 is output toward the outside through the terminal box 26.

The translucent substrate 21 is a substrate having high light transmittance for causing light to enter the solar cell elements 24, and for example, glass substrates of white glass, tempered glass, heat-reflective glass and the like, and synthetic resin substrates of a polycarbonate resin and the like can be preferably employed. The translucent substrate 21 preferably may have a thickness of approximately 3 mm to 5 mm in a case of a glass substrate, and approximately 5 mm in a case of a synthetic resin substrate.

The filler 22 is produced by forming, for example, a thermosetting resin or a resin having thermosetting property that is obtained by causing a thermoplastic resin to contain a crosslinking agent into a sheet shape with an extruding machine or the like, and then cutting it to a predetermined length.

The back surface protective member 23 has a function of protecting the filler 22. As the back surface protective member 23, for example, polyvinyl fluoride (PVF), polyethylene terephthalate (PET), polyethylene naphthalate (PEN), or one obtained by laminating those can be preferably employed.

The solar cell element 24 can employ various types of elements. The solar cell elements 24 as described above include, for example, crystalline solar cell elements of single crystal silicon, polycrystalline silicon and the like, an amorphous silicon solar cell element, a Si thin film solar cell element, a CIS-based solar cell element, a CIGS-based solar cell element and a dye-sensitized solar cell element.

In a case where the solar cell element 24 is manufactured of a single crystal silicon substrate or polycrystalline silicon substrate, a PN junction in which a p-layer containing a large amount of p-type impurities such as boron and an n-layer containing a large amount of n-type impurities such as phosphorus are joined is formed in the silicon substrate. An electrode is formed on a front surface or a back surface of the silicon substrate by, for example, screen-printing a silver paste. Note that soldering may be performed on a surface of the electrode for facilitating installation of the inner lead 25 or reducing degradation.

The inner lead 25 connects a solar cell element 24 and another solar cell element 24 adjacent to this. As the inner lead 25, for example, one obtained by performing solder plating for approximately 20 to 70 μm on a surface of a wiring material by plating or dipping, such as copper foil having a thickness of 0.1 mm to 0.5 mm.

(Frame)

Figure 2A:
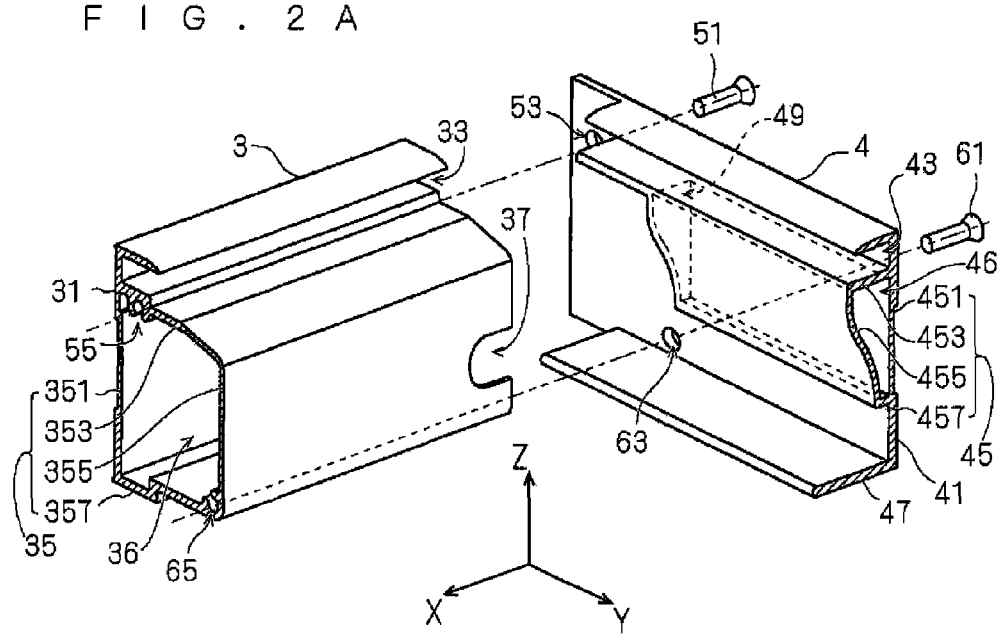
FIGS. 2A and 2B are views showing a connected portion of a first frame and a second frame.

The first frame 3 and the second frame 4 shown in FIG. 2A are formed for example, of aluminum, iron, stainless steel, resin or the like, and for example, is manufactured by extrusion molding. Note that for the sake of description, the solar cell panel 2 is not shown in FIGS. 2A and 2B and drawings thereafter.

The first frame 3 has the structure in which a groove-like fitting part 33 into which the side end part of the solar cell panel 2 is fitted and a first hollow member 35 having a first space 36 therein are provided to a perpendicular part 31 along the z-axis. The fitting part 33 and the first hollow member 35 extend along the longitudinal direction of the first frame 3.

The first hollow member 35 comprises an outer part 351 along the z-axis direction, a ceiling part 353 linked to the outer part 351 in a substantially perpendicular manner, an inner part 355 that is linked to the ceiling part 353 in a substantially perpendicular manner and is parallel to the outer part 351, and a bottom part 357 linked to the outer part 351 and the inner part 355 in a substantially perpendicular manner.

The outer part 351 constitutes part of the perpendicular part 31. The ceiling part 353 is part of the first hollow member 35 as well as part of the fitting part 33. A first drain port 37 is formed as a first communication hole in the first hollow member 35 by cutting out an end part of the inner part 355.

The second frame 4 has the structure in which a groove-like fitting part 43 into which the side end of the solar cell panel 2 is fitted, a second hollow member 45 having a second space 46 therein, and a plate-like bottom 47 are provided to a perpendicular part 41 along the z-axis direction. The fitting part 43, the second hollow member 45 and the bottom 47 extend along the longitudinal direction of the second frame 4. In fixing the solar cell module 1 to the stand, the bottom 47 is mounted on the stand with fixing members such as bolts.

The second hollow member 45 comprises an outer part 451 along the z-axis, a ceiling part 453 linked to the outer part 451 in a substantially perpendicular manner, an inner part 455 that is linked to the ceiling part 453 in a substantially perpendicular manner and is tilted relative to the outer part 451, and a bottom part 457 linked to the outer part 451 and the inner part 455 in a substantially perpendicular manner. The outer part 451 constitutes part of the above-mentioned perpendicular part 41. The ceiling part 453 is part of the second hollow member 45 as well as part of the fitting part 43. An opening 49 is formed on an end part of the second hollow member 45 in the longitudinal direction through which the inner space (second space 46) of the second hollow member 45 is communicated with the outside.

Figure 2B:
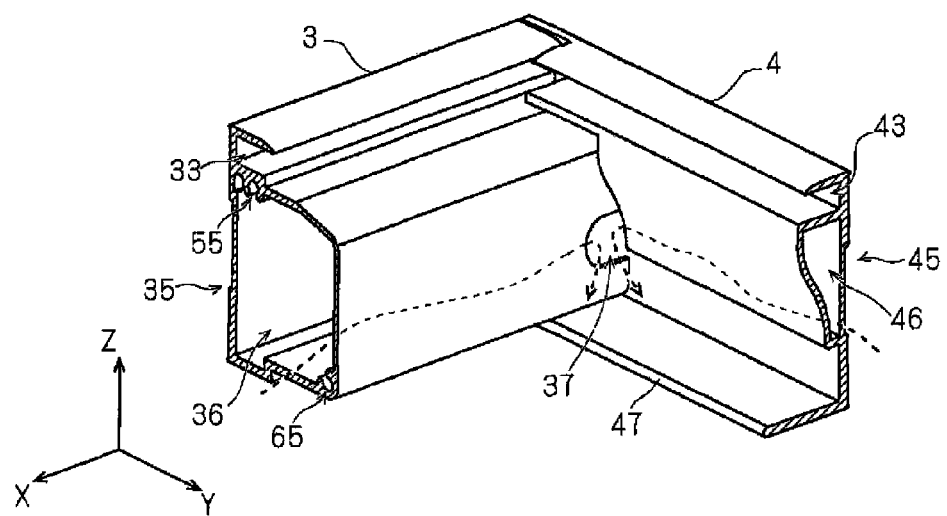

Note that the end part of the second hollow member 45 is cut out correspondingly to a shape of the end part of the first hollow member 35. As shown in FIG. 2B, in connecting the first frame 3 and the second frame 4, an end surface of the first hollow member 35 is caused to abut against the perpendicular part 41.

In this state, a bolt 51 is inserted into an insertion hole 53 provided in the perpendicular part 41, and is further screwed with a bolt hole 55 provided in a link part of the outer part 351 and the ceiling part 353. In addition, a bolt 61 is inserted into an insertion hole 63 provided to the perpendicular part 41 and is screwed with a bolt hole 65 provided to a link part of the inner part 355 and the bottom part 357. The first frame 3 and the second frame 4 are connected to each other by the connecting mechanism described above. Note that the connecting mechanism is not limited to those using bolts.

Figure 3:
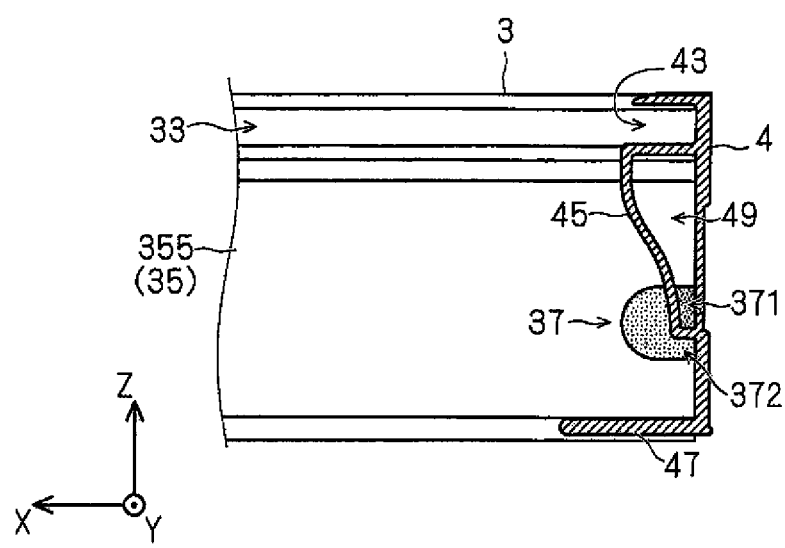
FIG. 3 is a cross-sectional view taken along a line B-B' of FIG. 1A.

In the state in which the first frame 3 and the second frame 4 are connected to each other (connected state) as shown in FIG. 3, the first drain port 37 includes an overlapping portion 371 (first opening region) that overlaps part of the opening 49, and the first space 36 and the second space 46 are connected in communication with each other through the overlapping portion 371. Note that an opening position of the first drain port 37 is set such that the overlapping portion 371 overlaps a lower edge (bottom of a—Z side) of the opening 49. In addition, the first drain port 37 includes an exposed portion 372 (second opening region) exposed to the outside, and the first space 36 and the outer space are communicated with each other through the exposed portion 372.

As indicated by dashed lines in FIG. 2B, the water that has entered the first hollow member 35 is discharged to the outside through the exposed portion 372 of the first drain port 37. In addition, the water that has entered the second hollow member 45 is discharged through the overlapping portion 371 and the exposed portion 372 of the first drain port 37. That is, the water or the like entering the second hollow member 45 to be accumulated in the bottom can be discharged through the first drain port 37 without providing a drain port in the second frame 4.

Further, as in the present embodiment, the strength of the first frame 3 is more enhanced compared with the second frame 4 by making a cross-sectional area of the first space 36 in cross section orthogonal to the longitudinal direction of the first frame 3 larger than a cross-sectional area of the second hollow space 46 in cross section orthogonal to the longitudinal direction of the second frame 4, which decreases an excessive reduction in strength due to the provision of the first drain port 37.

Note that in the connected state, the end part of the inner part 355 abuts against the second frame 4, and thus stress may be likely to be concentrated in this end part. Therefore, the first drain port 37 is formed by cutting out in curved pattern so that stress can be dispersed in a curved edge portion. Accordingly, deformation of the first frame 3 can be reduced.

As described above, the first hollow member 35, the second hollow member 45 and the outer space are communicated with each other through the first drain port 37, whereby it is possible to discharge the water that has entered the first hollow member 35 and the second hollow member 45 through the first drain port 37. Therefore, the number of processing steps can be reduced compared with a case where drain ports are individually provided to the first frame 3 and the second frame 4. Moreover, the number of drain ports can be reduced, and thus drainability can be enhanced without reducing the frame strength.

(Second Embodiment)

Next, a second embodiment is described with reference to FIG. 4. Note that in the following description, the elements having similar functions as those of the first embodiment are denoted by the same numerical references, and description thereof is omitted. The same holds true for the following embodiments.

Figure 4:
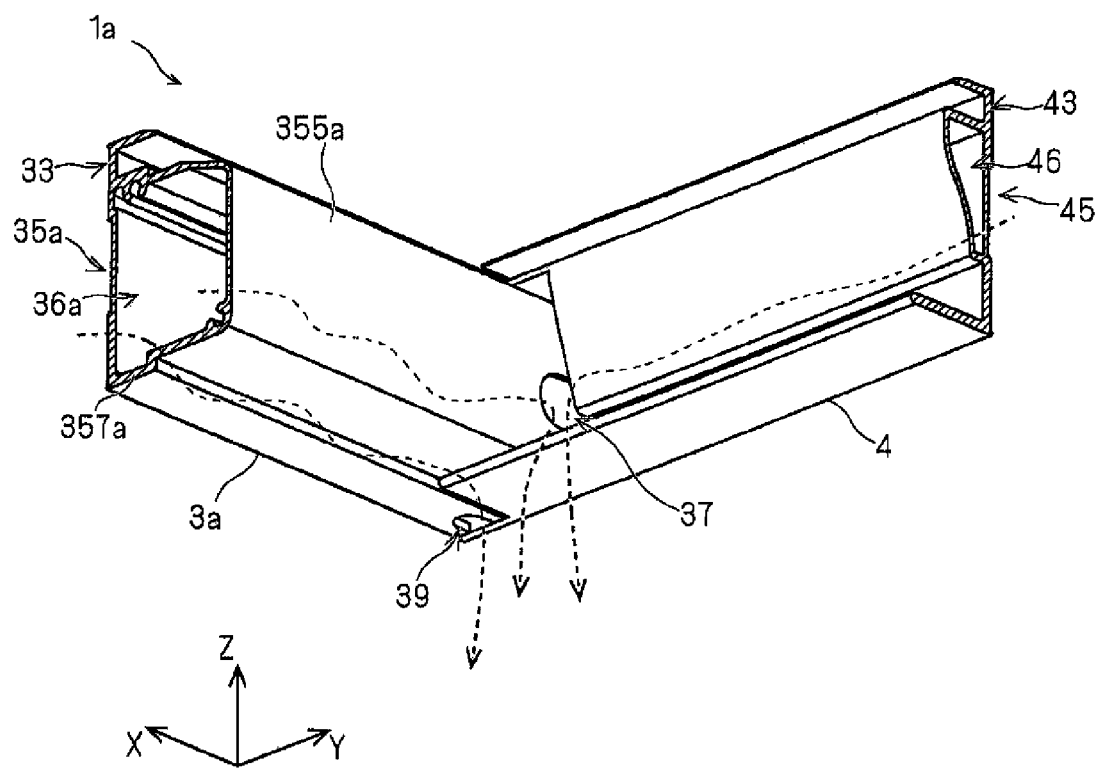
FIG. 4 is a perspective view showing a state of a first frame and a second frame according to a second embodiment when viewed from a back side.

A solar cell module 1a shown in FIG. 4 includes, in place of the first frame 3 according to the first embodiment, a first frame 3a in which a second drain port 39 as a second communication hole is further provided to a first hollow member 35a. The second drain port 39 is provided in the vicinity of an end part of a bottom part 357a in the longitudinal direction: the bottom of the first hollow member 35a. A first space 36a is communicated with the outer space also through the second drain port 39. Note that the first drain port 37 is provided to an inner part 355a: a side part of the first hollow member 35a.

In the present embodiment, the water accumulated in the bottom of the first hollow member 35a can be efficiently discharged by providing the second drain port 39, as indicated by dashed lines in FIG. 4. Further, the water can be discharged through the second drain port 39 even in a case where the exposed portion 372 of the first drain port 37 is clogged with dust, moss or the like.

(Third Embodiment)

Figure 5A:
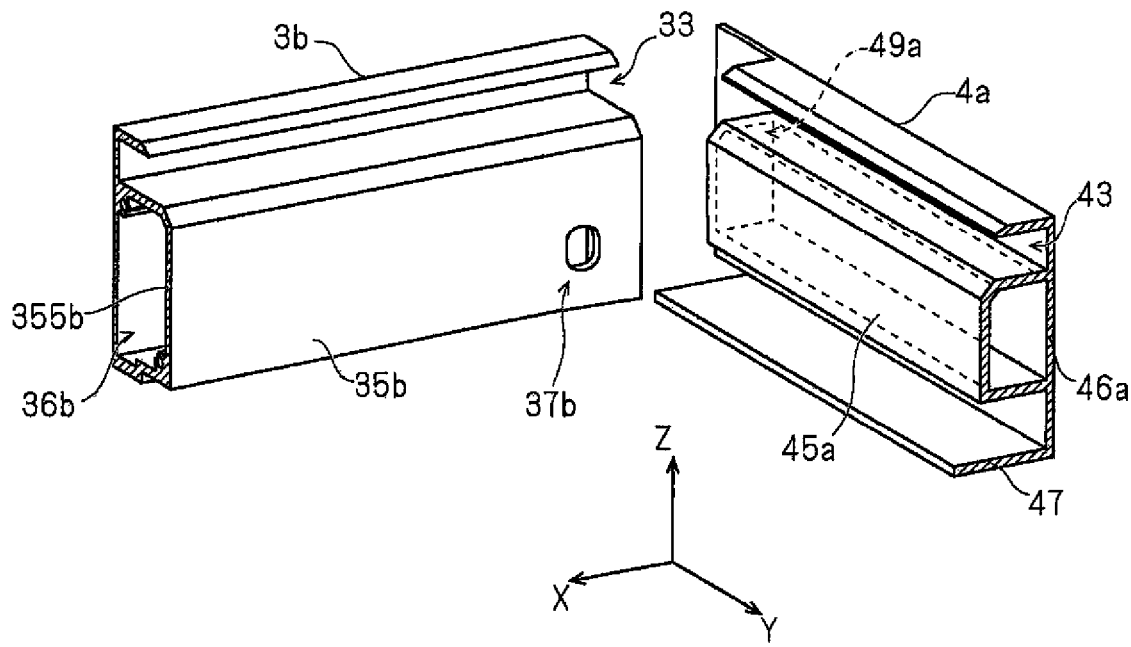
FIGS. 5A and 5B are views showing a connected portion of a first frame and a second frame according to a third embodiment.

In a frame 3b shown in FIG. 5A, a first drain port 37b having a substantially circular shape is provided at a position apart from the end part of an inner part 355b of a first hollow member 35b. The inside of a second hollow member 45a of a second frame 4a is a second space 46a being substantially rectangular in cross section. Further, an opening 49a for causing the second space 46a to be communicated with the outside is formed at the end part of the second hollow member 45a.

Figure 5B:
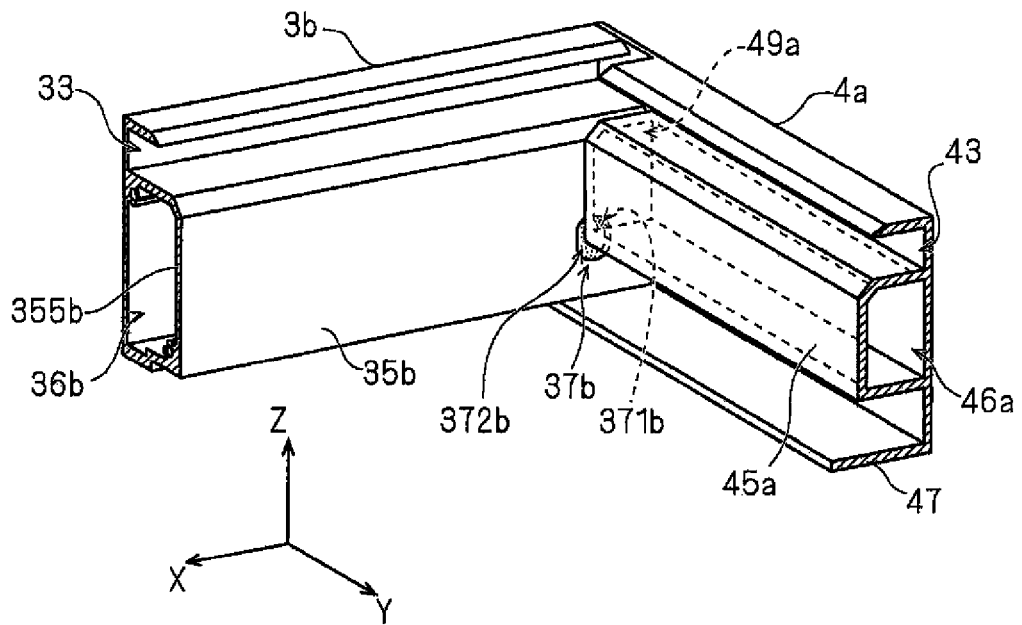

As shown in FIG. 5B, in the state in which the first frame 3b and the second frame 4a are connected to each other, a first drain port 37b includes an overlapping portion 371b (first opening region) overlapping the opening 49a, and a first space 36b and the second space 46a are connected in communication with each other through the overlapping portion 371b. In addition, the first drain port 37b includes an exposed portion 372b (second opening region) exposed to the outside, and the first space 36b is communicated with the outer space through the exposed portion 372b. Further, an opening position of the first drain port 37b is set such that the overlapping portion 371b overlaps a lower end part of the opening 49a. Accordingly, the water accumulated in the bottom of the second hollow member 45a can be efficiently discharged.

The end part is not required to be processed by making the position at which the first drain port 37b is provided apart from the end part of the first hollow member 35b, which decreases a reduction in strength of the end part. As a result, it is possible to reduce deformations of the end part on which stress is most likely to occur.

(Fourth Embodiment)

In a first frame 3c shown in FIG. 6, a first drain port 37c having a substantially circular shape is provided at a position apart from the end part of an inner part 355c of a first hollow member 35e. In addition, a second drain port 39c is provided at the end part of a bottom part 357c of the first hollow member 35c. Further, a second hollow member 45b having a substantially rectangular shape in cross section is provided in a second frame 4b. An opening 49b for causing a second space 46b to be communicated with the outer space is formed at the end part of the second hollow member 45b.

In the state in which the first frame 3c and the second frame 4b are connected, the first drain port 37c includes an overlapping portion 371c (first opening region) overlapping the opening 49b, and a first space 36c and the second space 46b are connected in communication with each other through the overlapping portion 371c. In addition, the first drain port 37c includes an exposed portion 372c (second opening region) exposed to the outside, and the first space 36c and the outer space are communicated with each other through the exposed portion 372c. Note that an opening position of the first drain port 37c is set such that the overlapping portion 371c of the first drain port 37c overlaps the opening 49b at a position above a lower end part of the opening 49b. By providing the first drain port 37c at the above-mentioned position, it is possible to reduce a possibility that the first drain port 37c and the second drain port 39c will be clogged with mud debris or the like at the same time.

(Fifth Embodiment)

Figure 7A:
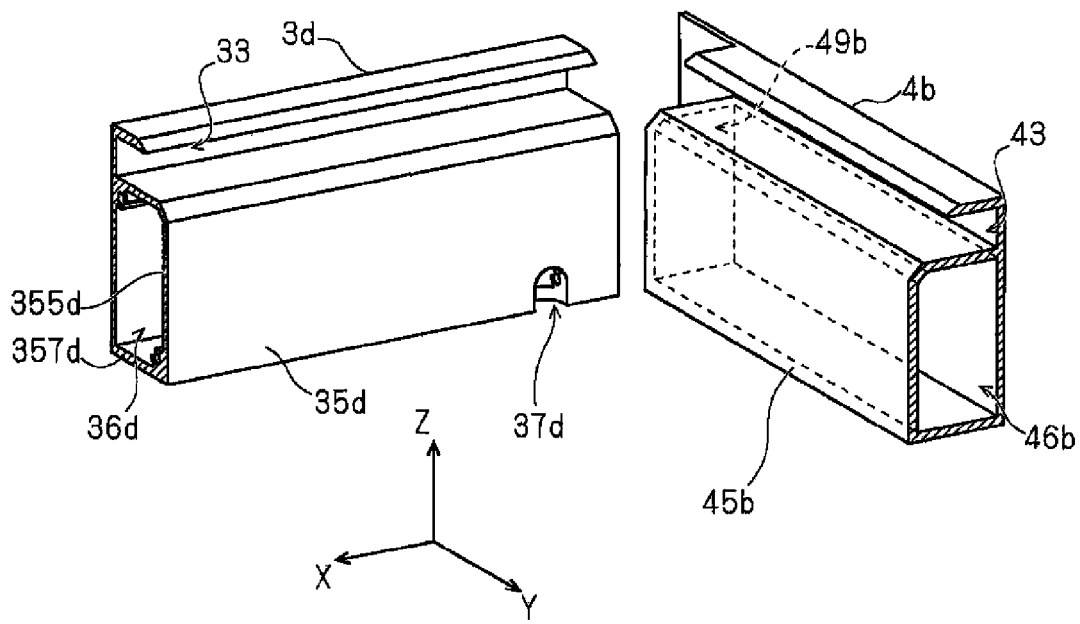
FIGS. 7A and 7B are views showing a connected portion of a first frame and a second frame according to a fifth embodiment.
Figure 7B:
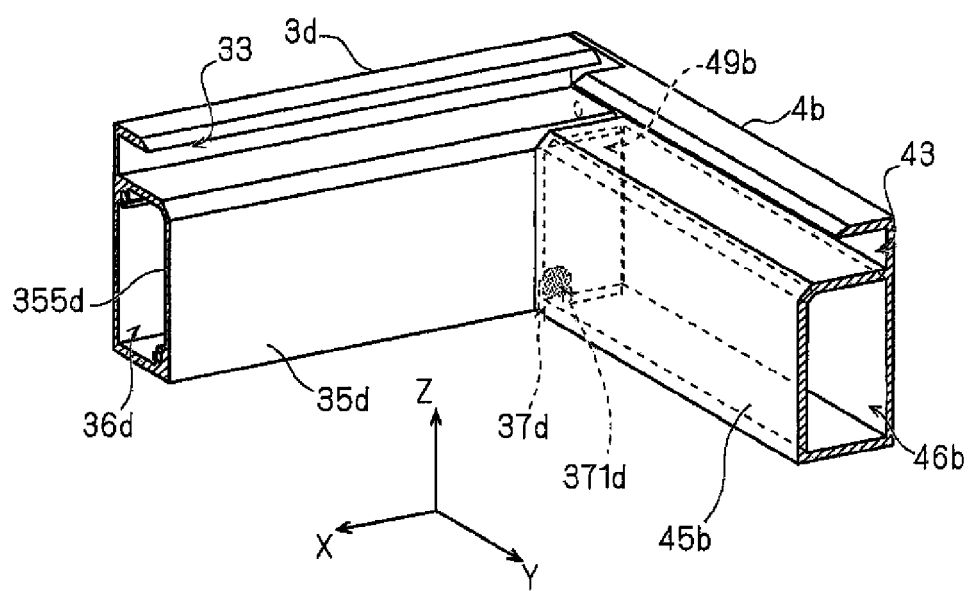

In a first frame 3d shown in FIG. 7A, a first drain port 37d is provided so as to extend from an inner part 355d to a bottom part 357d. In the state in which the first frame 3d and a second frame 4b are connected as shown in FIG. 7B, the first drain port 37d includes an overlapping portion 371d (first opening region) in which a portion that is open in the inner part 355d and an opening 49b overlap each other, and a first space 36d and a second space 46b are communicated with each other through the overlapping portion 371d. In addition, the first drain port 37d includes a portion (second opening region) that is open in the bottom part 357d, and the first space 36d and the outer space are communicated with each other through this portion.

The first drain port 37d is provided as described above, whereby the water that has entered the insides of the first hollow member 35d and the second hollow member 45b can be discharged through the first drain port 37d, and the water accumulated in the bottom of the first hollow member 35d can be also efficiently discharged.

(Modification)

The present invention is not limited to the above-mentioned embodiments, and numerous modifications and variations can be devised without departing from the scope of the invention.

For example, when a solar cell module is installed on a stand, in a case where a portion on which a load is likely to be applied and a portion on which a load is unlikely to be applied are generated between frames mounted around a solar cell panel, it is possible to minimize a reduction in frame strength due to the provision of drain ports by employing the frame to which a first drain port and a second drain port are provided as the frame on which a load is unlikely to be applied.

Further, in a case where a solar cell module is installed to be tilted relative to a horizontal surface such as the ground, first drain ports are not necessarily required to be provided at four corners of the solar cell module, and at least, are only required to be provided on a lower side (side in a direction in which water flows). That is, in the solar cell module as described above, a first frame to which a first drain port that becomes a first communication hole is provided is disposed so as to be substantially parallel to the horizontal surface and a second frame is disposed along a tilted surface that is tilted relative to the horizontal surface. The arrangement as described above can reduce the drain ports, which enables a reduction in the number of processing steps. In addition, it is possible to reduce an occurrence of clogging of drain ports due to infiltration of dust or the like through a drain port that is unrelated to drainage.

While the description is given of the frames that protect a solar cell panel having a superstrate structure in the embodiments above, the present invention is beneficial to frames that protect a solar cell panel having a substrate structure or a laminated glass structure.

The invention claimed is:

1. A solar cell module, comprising:
    a solar cell panel;
    an elongated first frame installed along a first edge of said solar cell panel; and
    a second frame installed along a second edge of said solar cell panel, wherein:
    said first frame comprises a first hollow member having a side part, an end surface, and a first space therein;
    said second frame comprises a second hollow member having a second space therein, said end part of the second hollow member is opposite to the side part of the first hollow member;
    said first hollow member comprises a first communication hole encompassed within said first hollow member and communicated with said first space and provided to said side part which is opposite to said end part of said second hollow member; and
    said first communication hole comprising a first opening region and a second opening region, said first opening region communicated with said second space of said second hollow member at said side part and said second opening region communicated with a space outside the frame at said side part.

2. The solar cell module according to claim 1, wherein said first hollow member further comprises a bottom, said bottom being provided with a second communication hole through which said first space and the outer space are communicated with each other.

3. The solar cell module according to claim 1, wherein said first communication hole is provided so as to extend from said side part to said bottom.

4. The solar cell module according to claim 1, wherein said first frame comprises a plurality of first frames and said second frame comprises a plurality of second frames, said first frames and said second frames being alternately connected.

5. The solar cell module according to claim 1, wherein said solar cell panel is substantially rectangular in plan view.

6. The solar cell module according to claim 1, wherein a cross-sectional area of said first space in cross section orthogonal to a longitudinal direction of said first frame is larger than a cross-sectional area of said second space in cross section orthogonal to a longitudinal direction of said second frame.

7. The solar cell module according to claim 1, wherein said first frame is disposed so as to be substantially parallel to a horizontal surface and said second frame is disposed so as to be tilted relative to the horizontal surface.

* * * * *